Nov. 23, 1926.
H. E. BUTLER
COMBINATION RECEPTACLE
Filed Jan. 15, 1923
1,607,864
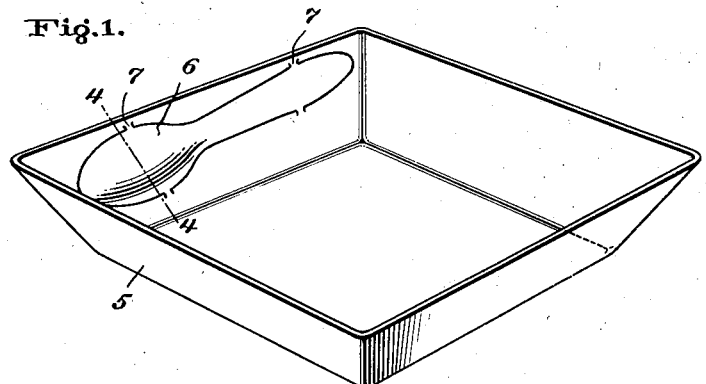
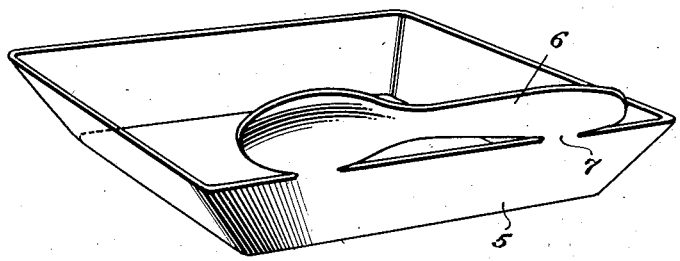
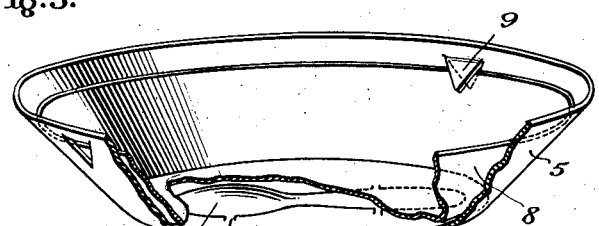
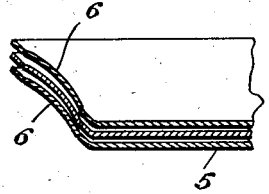
Inventor:
Henry E. Butler,
by *Alfred E. Bober*,
His Attorney, Patented Nov. 23, 1926.

1,607,864

UNITED STATES PATENT OFFICE.

HENRY E. BUTLER, OF SCHENECTADY, NEW YORK, ASSIGNOR OF ONE-HALF TO GEORGE M. BETTS, OF SCHENECTADY, NEW YORK.

COMBINATION RECEPTACLE.

Application filed January 15, 1923. Serial No. 612,629.

The present invention relates to receptacles such as plates or dishes used for serving ice cream or the like and particularly to receptacles of low cost which are intended to be used but once and then thrown away. Such receptacles find use in ice cream parlors, at public functions and other places and while the receptacles themselves are discarded, the spoons or other eating utensils are usually saved and used again. Now in many instances such spoons or other eating utensils are poorly cleansed and seldom if ever properly sterilized with the result that they become spreaders of disease and a menace to public health.

The object of my invention is to provide an improved receptacle having formed as a part of it an eating utensil which when removed from the receptacle may be utilized in eating the contents served in the receptacle. Preferably the arrangement is such that when the utensil is removed from the receptacle, the latter is partially destroyed or carries signs of having been used once already, thus doing away with the possibility of repeatedly using the same receptacle and eating utensil.

According to my invention I provide a receptacle made of suitable material such as celluloid, a hard fibre substance, metal, paper or the like, and form integral with it a suitable eating utensil such as a spoon for example. The eating utensil is pressed up or otherwise formed from the same material as that from which the receptacle is formed and may be entirely severed and held by friction or it may be only partly severed, the arrangement being such that the utensil is easily detached from the receptacle.

In the drawing, Fig. 1 is a perspective view of a receptacle embodying my invention; Fig. 2 is a perspective view of a modification; Fig. 3 is a perspective view of a further modification, and Fig. 4 is a detail sectional view taken on line 4—4, Fig. 1.

Referring to the drawing, 5 indicates a receptacle such as an ice cream dish and 6 indicates an eating utensil such as a spoon. In the embodiment of my invention shown in Fig. 1, spoon 6 is formed in a side wall of the dish and entirely from the material of such side wall so that it lies quite within the confines of the dish wall. It is given a suitable shape, being preferably formed at the same time and during the dish-forming operation. In the present instance it is entirely severed from the walls of the dish except at one or more points as indicated at 7. If found desirable it may be partially severed at these points. In this connection the essential thing is that the spoon be held sufficiently so it will not become separated from the dish accidentally but at the same time is easily and readily removed when it is to be used. The bowl of the spoon may be formed inwardly or outwardly but preferably it is formed inwardly as shown particularly in Fig. 4. As illustrated in Fig. 4, the dishes may be stacked one inside another for packing and the forming of the spoon as a part of the dish causes them to occupy little more space than heretofore.

The spoon, instead of being formed entirely within the confines of a wall of the dish may be formed only partly within its confines or entirely without the wall. This latter arrangement is shown in Fig. 2 wherein the spoon is shown as being formed integral with an edge wall of the dish and partially severed therefrom. As will be obvious, Figs. 1 and 2 illustrate the two extreme cases of the spoon formed entirely within a wall of the dish and entirely without it and any gradation between these two extremes may be used.

In Fig. 3, I have illustrated a modification of my invention wherein the spoon is formed in the bottom of the dish and the dish is of a type in which a thin paper filler is used. The filler is indicated at 8 and it may be held in place by tabs 9 struck from the side wall of dish 5. In Fig. 3, the bowl of the spoon is struck toward the inside of the dish.

In the use of my invention, the ice cream or other substance to be served is placed in the dish and given to the patron who thereupon takes hold of an end of the spoon and removes it from the dish. In this way the patron is ensured of a spoon which has not been used before and also of a dish which has not been used before. After being used once, the dish and spoon are both discarded.

Receptacles embodying my invention may be manufactured at a low cost, the addition of the spoon adding little to the cost, and when used have the advantage of being thoroughly sanitary and of doing away with all washing and sterilizing.

In accordance with the requirements of the Patent Office, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A paper receptacle having a weakened line forming the outline of a detachable utensil integral with the wall of the receptacle.

2. A paper receptacle having a wall provided with weakened lines which define a utensil wholly within the confines of the wall of the receptacle and adapted to be readily detached therefrom.

In witness whereof, I have hereunto set my hand this 12th day of January, 1923.

HENRY E. BUTLER.